US008825371B2

United States Patent
Prokhorov et al.

(10) Patent No.: US 8,825,371 B2
(45) Date of Patent: Sep. 2, 2014

(54) NAVIGATION OF ON-ROAD VEHICLE BASED ON VERTICAL ELEMENTS

(71) Applicant: Toyota Motor Engineering & Manufacturing North America, Inc., Erlanger, KY (US)

(72) Inventors: Danil V. Prokhorov, Canton, MI (US); Yasuo Uehara, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/720,465

(22) Filed: Dec. 19, 2012

(65) Prior Publication Data

US 2014/0172290 A1   Jun. 19, 2014

(51) Int. Cl.
  *G06G 7/78*   (2006.01)

(52) U.S. Cl.
  USPC ............................. 701/408; 701/300; 340/435

(58) Field of Classification Search
  CPC .......... G08G 1/16; G08G 7/78; G01S 13/931; G08C 2201/91
  USPC ................. 701/1, 2, 300, 408, 411, 412, 540; 340/435, 436
  See application file for complete search history.

(56) References Cited

U.S. PATENT DOCUMENTS

| | | | |
|---|---|---|---|
| 6,438,491 B1 * | 8/2002 | Farmer ......................... | 701/301 |
| 7,756,640 B2 | 7/2010 | Ueyama et al. | |
| 7,840,352 B2 | 11/2010 | Strelow et al. | |
| 7,983,802 B2 * | 7/2011 | Breed ............................. | 701/1 |
| 8,078,349 B1 | 12/2011 | Prada Gomez et al. | |
| 8,583,361 B2 * | 11/2013 | Lewis et al. .................... | 701/408 |
| 2003/0004644 A1 * | 1/2003 | Farmer ......................... | 701/301 |
| 2010/0004856 A1 | 1/2010 | Kobori et al. | |
| 2010/0063651 A1 | 3/2010 | Anderson | |
| 2011/0046784 A1 | 2/2011 | Anderson | |
| 2011/0066303 A1 | 3/2011 | Hara | |
| 2011/0246027 A1 | 10/2011 | Miyajima | |
| 2013/0024075 A1 * | 1/2013 | Zagorski et al. ................ | 701/46 |
| 2013/0054093 A1 * | 2/2013 | Furst et al. ...................... | 701/45 |
| 2013/0054133 A1 * | 2/2013 | Lewis et al. .................... | 701/423 |

* cited by examiner

*Primary Examiner* — Mary Cheung
*Assistant Examiner* — Rodney Butler
(74) *Attorney, Agent, or Firm* — Oblon, Spivak, McClelland, Maier & Neustadt, L.L.P.

(57) ABSTRACT

A vehicle can include a navigation unit configured to determine a position of the vehicle. A detection unit can be configured to recognize position and features of objects external to the vehicle. An identification unit can be configured to identify objects expected to be detected based on a determined position of the vehicle, by comparing the recognized features to feature data of object reference data stored in a local database. When the identification unit is unable to identify an object, the identification unit can compare recognized or stored object features to the additional feature data received from a remote database. A navigation unit can update the position of the vehicle based on position data of identified objects and more accurate and safe autonomous operation of a vehicle can be achieved.

17 Claims, 9 Drawing Sheets

NAVIGATION OF ON-ROAD VEHICLE BASED ON VERTICAL ELEMENTS

BACKGROUND

Aspects of this disclosure relate to an autonomous driving system for an automobile. Vehicle systems can utilize sensors and/or imaging devices to detect objects surrounding a vehicle and distinguish between on-road elements such as curbs, lanes, and road signs and off-road elements including objects elevated above a certain height. These elevated objects can be detected to refine a determined position of the vehicle, in order to generate drive instructions for autonomous operation of the vehicle.

SUMMARY

Apparatuses, including processing systems, can implement algorithmic processes in or related to a control vehicle, and can provide autonomous functionality or operability. A non-transitory computer readable medium, such as a memory, can store a computer program to execute an algorithmic process via one or more processing devices or components.

An apparatus for a vehicle can include a navigation unit configured to determine a position of the vehicle. A detection unit can be configured to detect objects that are external to the vehicle, and to recognize features of the objects. A local database can be configured to store object reference data, which may include feature data and position data identifying positions of the objects. An identification unit can be configured to identify objects that are expected to be detected based on a determined position of the vehicle by comparing the features of the objects that are recognized by the detection unit to the feature data of the objects that are expected to be detected in the local database. A transceiver can be configured to communicate with a remote database that stores additional object reference data, including additional feature data of the objects and corresponding position data identifying positions of respective objects. Further, in response to the identification unit determining it is unable to identify a first object, the transceiver can be configured to communicate with the remote database to access the additional object reference data. The identification unit can be configured to compare features of the first object to the additional feature data to identify the first object. The navigation unit can be further configured to update the position of the vehicle based on position data of identified objects.

In response to the identification unit determining it is unable to identify the first object, the identification unit can be configured to compare respective feature data between the local database and the remote database, for objects that are expected to be detected based on the determined position of the vehicle, and update the local database to reflect additional information included in the remote database.

Additional information can include updated position or feature data for an object.

The first object can be one of the objects that are expected to be detected based on the determined position of the vehicle, and the identification unit can be configured to compare the recognized features of the detected objects to feature data of the first object to identify one of the detected objects as the first object.

The first object can be an object that is detected by the detection unit. In response to the identification unit determining the first object is not one of the objects that are expected to be detected based on the determined position of the vehicle, the transceiver can be configured to receive an identification response from the remote database.

In response to the identification response including an identification of the first object and a corresponding position, the local database can be configured to store corresponding object reference data for the first object.

In response to the identification response including position data of the vehicle, which the remote database may determine based on the recognized features transmitted to the remote database, the navigation unit can be configured to update the position of the vehicle based on the position data included in the identification response.

A display can be included. The display can display an image of an area in which the objects expected to be detected are located in response to the identification unit determining that it is unable to identify the first object after comparing features of the first object to the additional feature data of the additional object reference data or determining it is unable to access the additional object reference data to identify the first object. The display can receive at least one of an object selection input and an object definition input, and the display can identify the first object based on the object selection input or the object definition input.

The local database can be configured to store common object reference data including feature data of common objects that are independent of the determined position of the vehicle. The identification unit can be configured to generate an object list based on the object reference data and the common object reference data, when the identification unit is unable to access the additional object reference data. The identification unit can be configured to generate the object list based on the object reference data, the common object reference data, and the additional object reference data, when the identification unit is unable to identify the first object by comparing the features of the first object to the additional feature data of the additional object reference data.

The display can be configured to display a selection menu including the object list when the interface unit displays the image.

The object selection input can be provided through the selection menu, and the object selection input can be a selection of an item in the object list. The object definition input can be provided through the selection menu, and can be a selection of an independent object identification. The independent object identification can be a user definable input independent of the object list.

The identification unit can be configured to determine feature data of the first object, and position data identifying a position of the first object, based on the object selection input or the object definition input. The identification unit can be configured to update the object reference data with the determined feature data and the determined position data.

The identification unit can be configured to remove respective feature data and respective position data included in the object reference data when the first object is an object expected to be detected, and a comparison of features of the first object to the additional feature reference data indicates the first object expected to be detected is no longer present. The identification unit can be configured to remove respective feature data and respective position data included in the object reference data when receiving an object selection input or an object definition input indicating the first object expected to be detected is no longer present.

The identification unit can be configured to update the object reference data with position data for an object that is expected to be detected that is detected in a position that is different than a respective position identified by respective position data included in the object reference data.

A filter unit can be included. The filter can be configured to filter detected objects from identification by the identification unit, by removing detected objects that are determined to not be off-road objects that are elevated above a road, on which the vehicle is driven, by a predetermined elevation.

The predetermined elevation can be 10 ft.

The detection unit can be configured to recognize features of the objects based on an output image of an imaging device. The imaging device can include one or more cameras and one or more lidars. The identification unit can be configured to perform feature comparison with the output image to compare the features of the objects recognized by the detection unit to feature data.

An apparatus for a vehicle can include navigation means for determining a position of the vehicle; detection means for detecting objects that are external to the vehicle, and for recognizing features of the objects; and storage means for locally storing object reference data, the object reference data including feature data of objects, and position data identifying positions of the objects. The apparatus can include identification means for identifying objects that are expected to be detected based on a determined position of the vehicle by comparing the features of the objects that are recognized by the detection means to the feature data of the objects that are expected to be detected stored in the storage means. A transceiver can be provided for communicating with a remote database that stores additional object reference data, the additional object reference data including additional feature data of the objects and corresponding position data identifying positions of respective objects.

In response to the identification means determining that it is unable to identify a first object, the transceiver can communicate with the remote database to access the additional object reference data, and the identification means can compare features of the first object to the additional feature data to identify the first object. The navigation means can update the position of the vehicle based on position data of identified objects.

A method for a vehicle can include determining a position of the vehicle; detecting objects that are external to the vehicle, and recognizing features of the objects; accessing, from a local database, object reference data that is stored in the local database, the object reference data including feature data of objects, and position data identifying positions of the objects; and identifying objects that are expected to be detected based on a determined position of the vehicle by comparing the features of the objects that are recognized in the recognizing to the feature data of the objects that are expected to be detected stored in the local database. Communication with a remote database can be initiated in response to determining that a first object cannot be identified, and accessing additional object reference data of the remote database, the additional object reference data including additional feature data of the objects and corresponding position data identifying positions of respective objects. Features of the first object can be compared to the additional feature data to identify the first object. The position of the vehicle can be updated based on position data of identified objects.

The method can be implemented via one or more processors or processing systems. Further, a non-transitory computer-readable storage medium including executable instructions, which when executed by one or more processors, can cause the one or more processors to perform the method.

The foregoing paragraphs have been provided by way of general introduction. The described implementations and examples, together with the attendant advantages thereof, will be best understood by reference to the following detailed description taken in conjunction with the accompanying drawings.

BRIEF DESCRIPTION OF THE DRAWINGS

A more complete appreciation of aspects of this disclosure and many of the attendant advantages thereof will be readily obtained as the same becomes better understood by reference to the following detailed description when considered in connection with the accompanying drawings, wherein.

DETAILED DESCRIPTION

Figure 1:
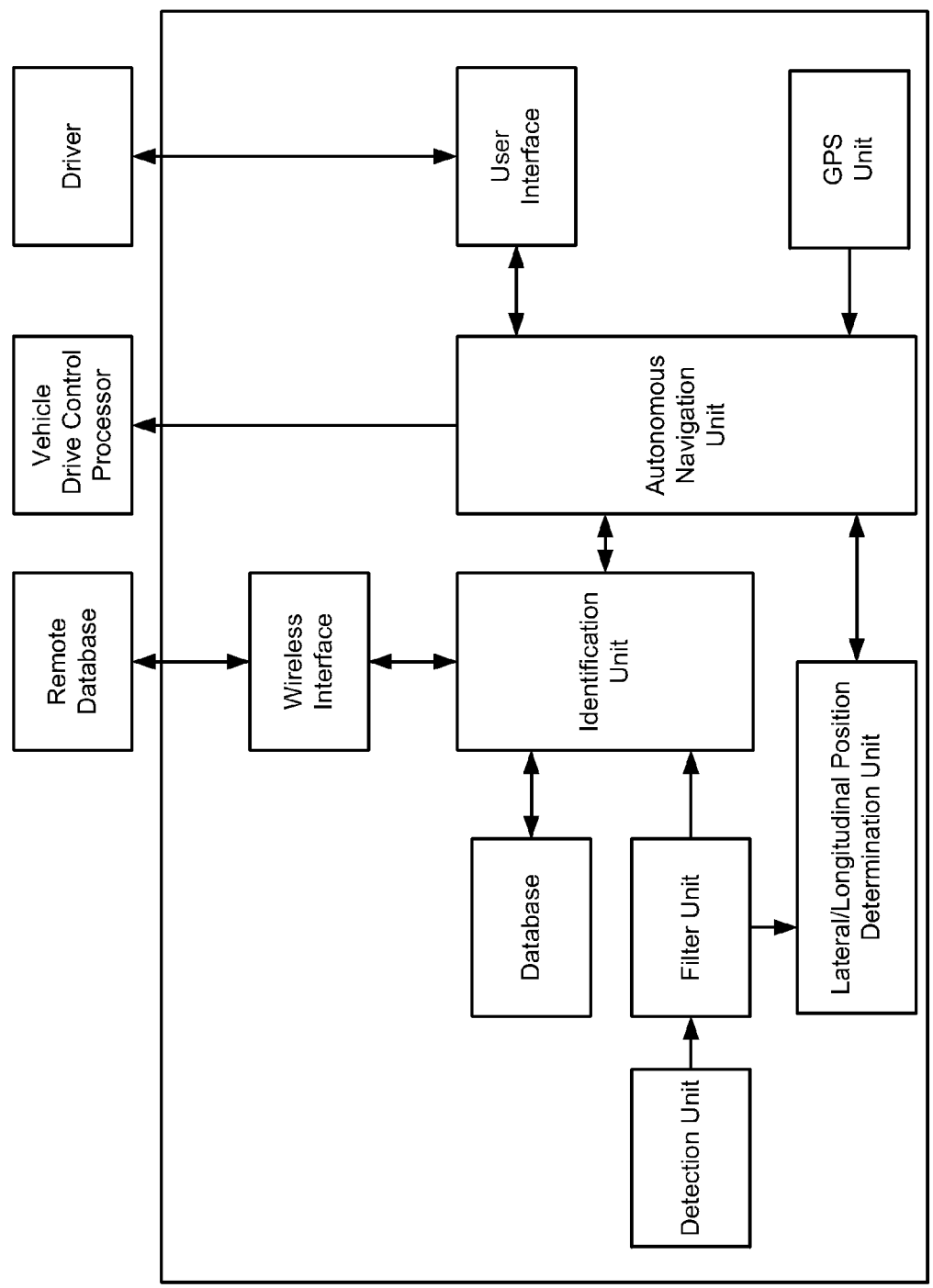
FIG. 1 schematically illustrates an exemplary control system.

In the drawings, like reference numerals or indicators designate identical or corresponding parts throughout the several views. Further, as used herein, the words "a," "an" and the like generally carry a meaning of "one or more," unless stated otherwise. Further, aspects and algorithms of this disclosure can be implemented by one or more computerized systems than can be discretely provided or collaboratively connected via, e.g., a network.

Aspects of this disclosure improve vehicle position determination and autonomous vehicle operation by comparing an estimated position to a vehicle position determined by detecting off-road elevated objects expected to be around the vehicle for a given route.

A vehicle control system can utilize already existing objects that will be located around a vehicle over a predetermined vehicle route, to continuously refine a vehicle position used to operate the vehicle autonomously to reach a desired location.

A vehicle control system can utilize digital satellite and street-level maps, which can be previously stored in a local database of a vehicle control system or acquired through a wireless network, to be provided with feature and position data of existing objects along a vehicle route. A vehicle control system can filter the feature and position data into a subset of object reference data corresponding to existing objects with certain features and determine a list of expected objects. Features that can be used for filtering data can include type of object and elevation relative to a road being traveled on by a vehicle. An expected vehicle position along a vehicle route can be determined by a vehicle control system using position data included in object information corresponding to a list of expected objects. A vehicle control system can formulate driving instructions for autonomous operation of a vehicle based on an expected position of a vehicle.

A plurality of sensors can be utilized by a vehicle control system to detect and recognize features of objects in the vicinity of a vehicle operating autonomously along a predetermined vehicle route. Detected feature and position data for detected objects in the vicinity of a vehicle, can be filtered into a subset of detected object information based on recognized features. Features utilized to filter the detected feature and position data may include object type and elevation above a road autonomously driven on by a vehicle. A vehicle control system can compare detected object information to object reference data corresponding to expected objects, and determine if expected objects have been detected. A vehicle control system can estimate a vehicle position based on position data of detected objects and modify driving instructions for autonomous operation of a vehicle based on the estimated position. When the position data of a detected object, which is expected to be along the predetermined route, differs from the position data indicated by detected object information for a corresponding expected object, the object reference data is updated with the detected object position data.

A more accurate and safe autonomous operation of a vehicle can be achieved due to the abundance of objects that can be used to estimate and refine a vehicle position along a predetermined route. Once an expected object has been identified, or a group of expected objects have been identified, a vehicle can be controlled to refine its position and orientation ("pose") and update its odometry to achieve more precise navigation, while following high-level driving instructions from a navigation unit. Objects of certain types and elevations (e.g. buildings, light and cable supporting poles, trees, advertising signs) are many in number, and can be readily detected because they are not easily obstructed by other elements or structures along a road. Using known locations of certain objects as points of reference, can provide numerous comparison points to ensure a vehicle operated autonomously reaches a desired location safely. In addition, updating position data of expected objects with position data of detected objects reduces the number of comparisons between reference data and detected object information required for subsequent trips to previously selected destinations.

Aspects of the present disclosure will now be discussed with reference to the drawings, wherein like reference numerals designate identical or corresponding parts throughout the several views.

FIG. 1 illustrates a block diagram of a control system according to an exemplary embodiment. As illustrated in FIG. 1, the control system may include a detection unit. The detection unit may include one or more sensors which are configured to detect information including operating conditions of the vehicle and position data of objects in an area surrounding the vehicle. The sensors may, e.g., be one or more of a lidar, a radar, a sonar, a camera, or a combination thereof. The type, mounting location, and number of sensors included in a detection unit of the control system of FIG. 1 may be selected according to the type of vehicle in which the control system is employed.

The vehicle control system may include a filter unit that may receive feature and position data from the detection unit and distribute to this data to the appropriate processing unit of the control system. With respect to detected feature and position data, the filter unit may determine the data from the detection unit indicates objects are of a certain type and elevation. The filter unit may filter object information including feature and position data related to off-road vertical stationary objects (e.g. light and electricity poles, tree trunks, street lamps, building edges, elevated signage), based on an elevation of the off-road vertical stationary objects, and send the object information to an identification unit discussed below.

As illustrated in FIG. 1, the vehicle control system may include a lateral/longitudinal position determination unit. The lateral/longitudinal position determination unit may include a longitudinal position system and lateral position system. The longitudinal position system may be comprised of an in-vehicle odometry system, which may determine a longitudinal position of a vehicle based on information provided through the filter unit and from the detection unit. The in-vehicle odometry system may utilize information from sensors that are in an anti-lock braking system (ABS) on wheels that are not driven, and/or a road texture recognition camera which may be part of a detection unit.

The lateral position system of the control system illustrated in FIG. 1, may determine a vehicle's position relative to road or lane boundaries. The lateral position system may utilize information from vehicle side mounted lidars or other types of sensors which may be part of the detection unit, and associated processing algorithms to determine a lateral position of a vehicle. The lateral position system may observe road lateral profiles (e.g., the width of a road or lane), and may compare observed profiles to map based information provided by a navigation system that may be included in an autonomous navigation unit discussed in more detail below.

As illustrated in FIG. 1 and discussed above, the vehicle control system may include the autonomous navigation unit including the navigation system. The navigation system may include satellite and street level maps from a GPS unit, and two-dimensional road curvature information. The two-dimensional road curvature information may include location and length of straight/curved segments of roads, and other road specific information (e.g. road elevation and slope). The autonomous navigation unit may process the satellite and street level maps, and the two-dimensional road curvature information, and provide high level driving directions (e.g., turns, lane changes, road construction) to be executed by a vehicle drive control processor.

As illustrated in FIG. 1, the vehicle control system may include a user interface that may be in two-way communication with a driver and the autonomous navigation unit. The user interface may receive satellite and street level maps from the autonomous navigation unit to be displayed to the driver for selection of a location to which the vehicle is to be autonomously driven. The user interface may receive a location selection input from the driver, and provide the location selection input to the autonomous navigation unit. The autonomous navigation unit may determine an optimal route over which the vehicle is to be autonomously driven based on the destination selected and information from the navigation system. The optimal route information can take into account the driver's personal preferences (i.e. driver may want to avoid particular roads or areas where heavy traffic may be expected). The optimal route information may include all points of changes in direction, road changes, turns, etc., which may, along with other general road information be processed, by the autonomous navigation unit and converted into a sequence of driving directions to be executed by the vehicle drive control processor.

In addition to the route information previously described, the autonomous navigation unit will poll the route information from the navigation system corresponding to the optimal route for object data corresponding to general landmarks. The autonomous navigation unit may filter the object data for the general landmarks, and send object reference data including feature and position data to the identification unit. The object reference data may correspond to general landmarks that are off-road vertical stationary objects which may include light and electricity poles, tree trunks, street lamps, building edges, elevated signage, etc.

The identification unit may receive data from a vehicle local database, a wireless interface in communication with a remote database, the filter unit, and the autonomous navigation unit. When the identification unit receives object reference data from the autonomous navigation unit, the identification unit may create a list of objects expected to be on the route for autonomous operation. The identification unit may send object reference data, including feature and position data for the expected objects, to the database for referencing during autonomous operation of the vehicle.

During autonomous operation, the filter unit may send detected object information of detected off-road vertical stationary objects to the identification unit. The identification unit may compare the detected object information to the feature and position data in the object reference data corresponding to the expected objects. Based on the comparison, the identification unit may determine if objects on the list of expected objects have been detected, and identify them. The position data of identified objects can be sent to the autonomous navigation unit to determine an estimated vehicle position relative to the identified objects. In a situation where an expected object is not detected, the identification unit may communicate with the wireless interface to receive additional object reference data. The identification unit may send a list of objects to the user interface through the autonomous navigation unit to receive one of an object selection input, or driver defined object definition input. The autonomous navigation unit may update the vehicle position to continuously modify the sequence of driving instructions based on the vehicle's position.

Figure 2:
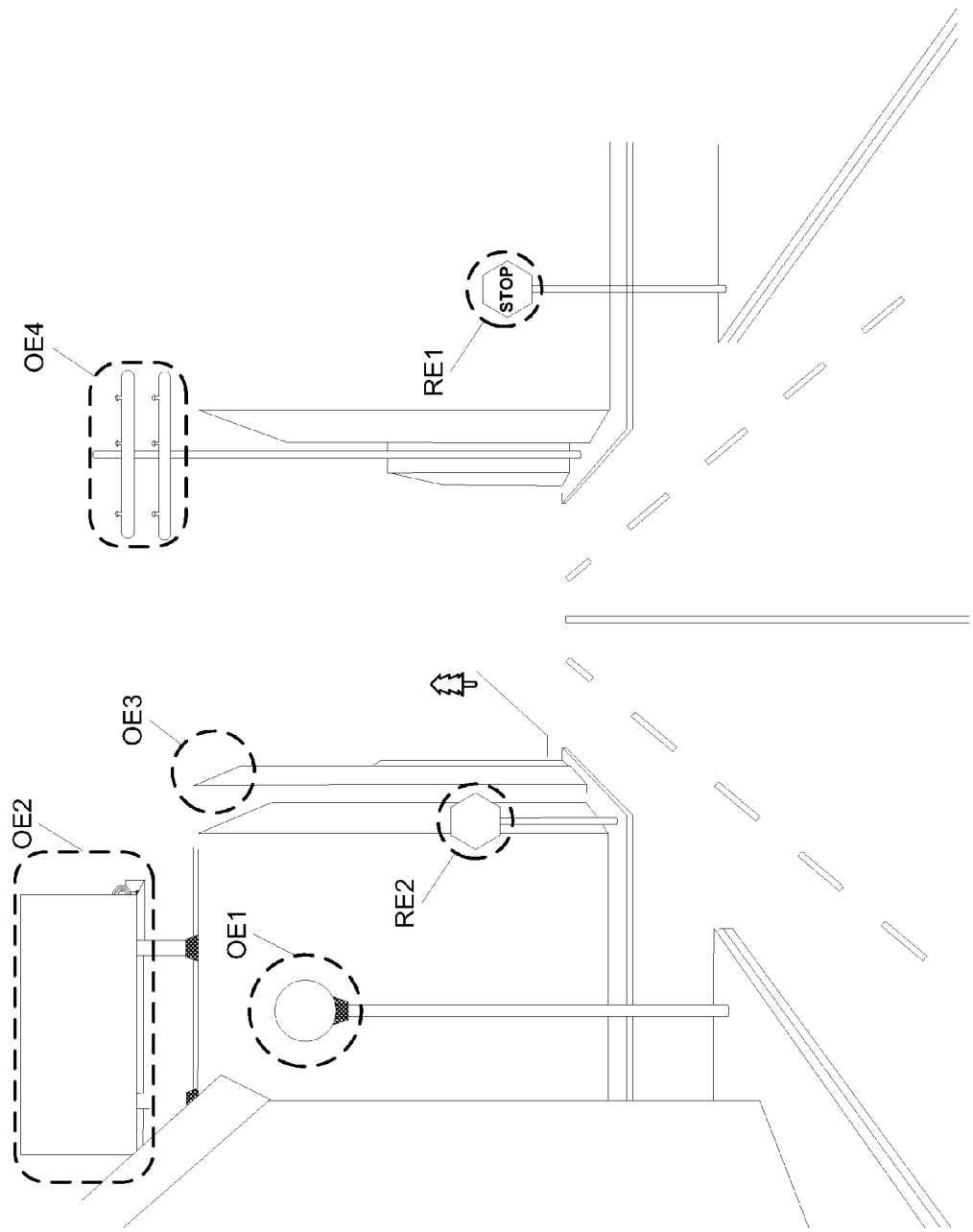
FIG. 2 illustrates a view of a road traveled on by a vehicle including objects to be identified.
Figure 3:
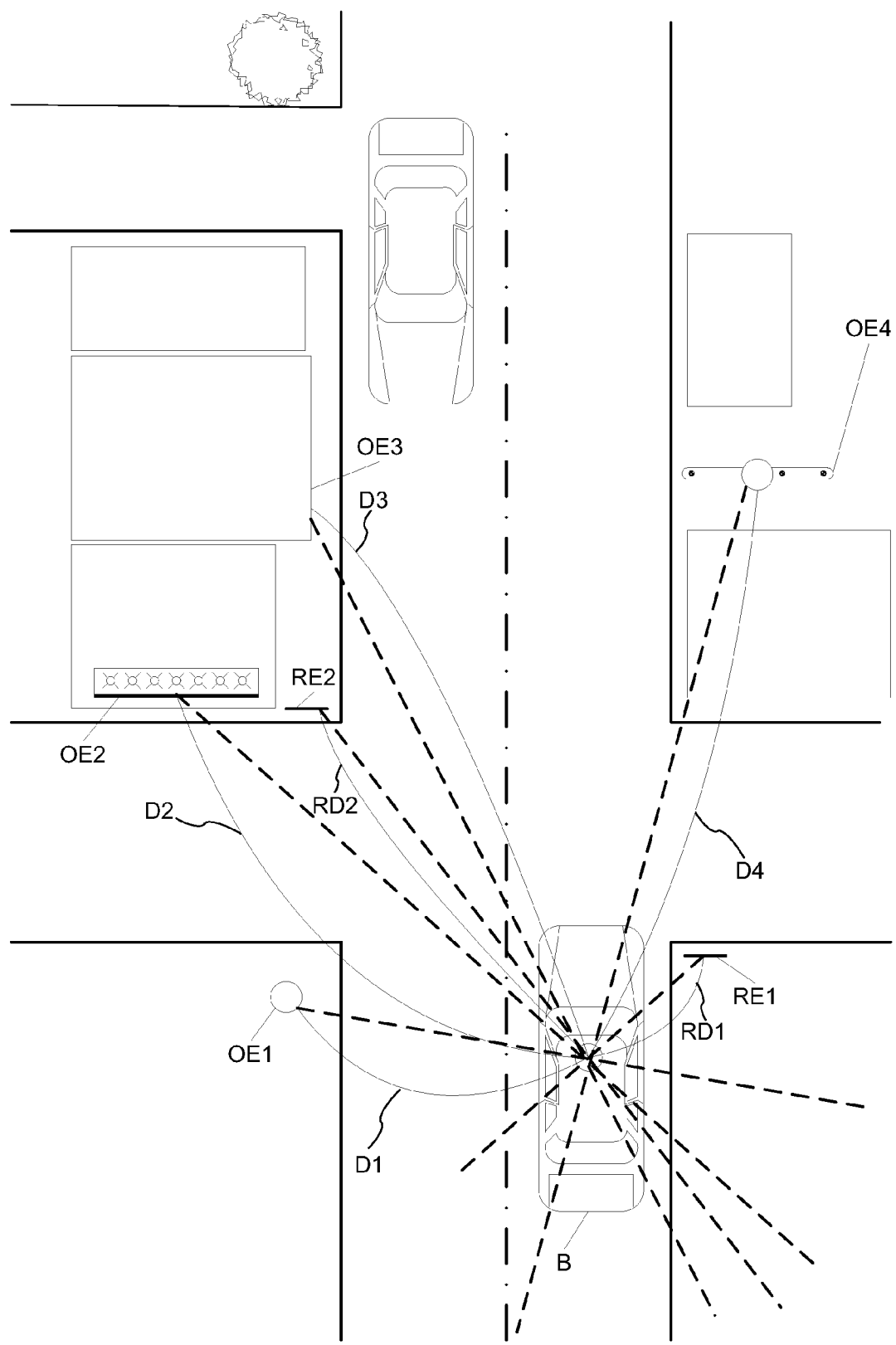
FIG. 3 illustrates a view of vehicle detecting objects on the road of FIG. 1.

FIG. 2 illustrates a road that a vehicle may be autonomously driven on using a control system. FIG. 2 also illustrates two types of objects that may be detected by a control system. The first set of objects include on-road objects (RE1, RE2) which may include road signs, curbs, mile markers, stoplights, mailboxes etc. The second set of objects may include elevated stationary objects (OE1-OE4). FIG. 3 illustrates a vehicle (B) obtaining detection signals (D1-D4, RD1, RD2) which may be acquired via various sensors (e.g., lidars, radar, sonar, or cameras). The detection signals (D1-D4, RD1, RD2), processed as feature and position data, will be filtered into detected object information and used by a control system to estimate and refine a vehicle's position for the purpose of autonomous driving operation.

Figure 4:
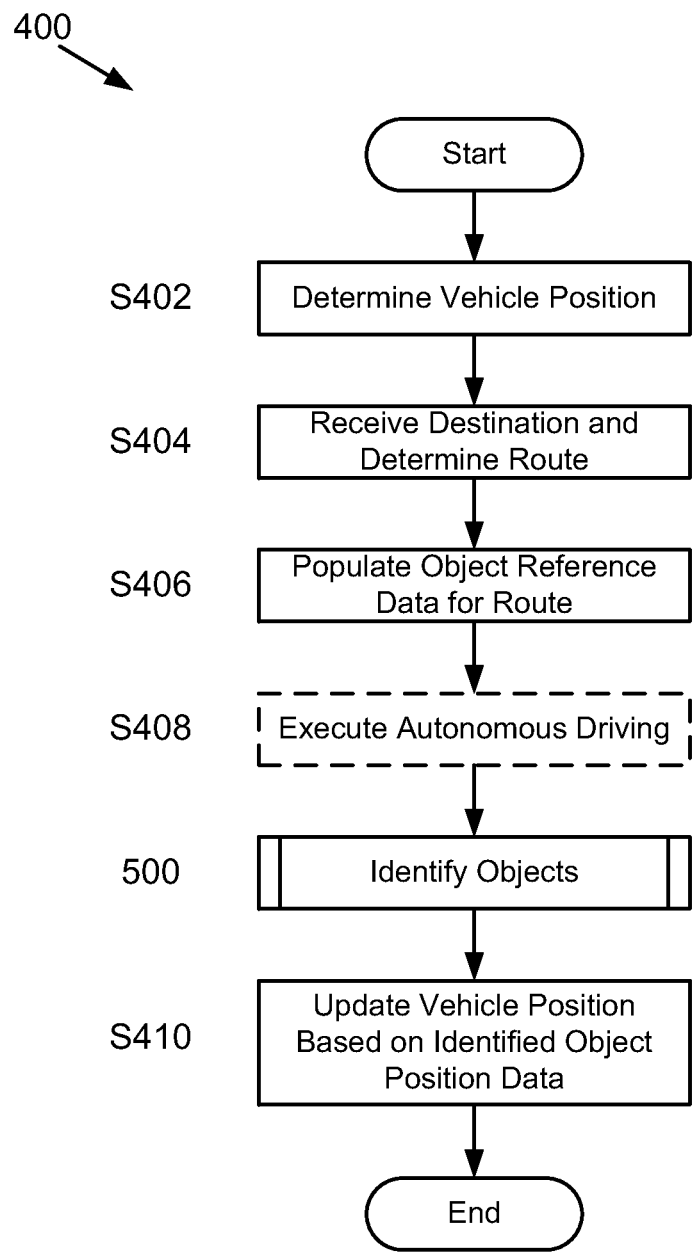
FIG. 4 is an algorithmic flow chart illustrating an exemplary control system method and process.

FIG. 4 is an algorithmic flow chart illustrating an exemplary control system method and process 400.

At step S402, the control system determines a position and orientation of a vehicle with respect to a map after the vehicle has been moved to a known position through normal operation or by direction of the control system. For example, the control system may operate a user interface or display to show a closest known location based on a current location, and instruct a driver to move the vehicle to the known location in response to an autonomous driver operation request.

At step S404, the control system receives a desired destination that has been specified by a driver. A control system may determine a route along which the vehicle will be autonomously driven to reach the desired location from navigational data that may be stored in a local database or provided through an external source (such as a GPS unit). Based on the determined route, a control system may process the navigational data for route information, and determine a sequence of driving instructions to be executed to autonomously drive a vehicle. The determined vehicle route may incorporate driver input preferences regarding roads to avoid, traffic considerations, time of day, etc.

At step S406, the control system will extract from the route information, object reference data including position and feature data for objects meeting certain criteria, which will be along the vehicle route. The criteria may be based on the type of object along the route (i.e. on-road or off-road) and the object's elevation above the road traveled on for the vehicle route. The elevation threshold may be an elevation of at least 10 ft. above a road, but may be another value. The object reference data, including position data, may be stored in a vehicle's local database. The control system will populate a list of expected objects based the certain criteria and link corresponding object reference data in the local database to each expected object. The object reference data may also include sequence data for objects meeting the certain criteria. The sequence data may correspond to an expected sequence the objects are expected to be encountered by a vehicle traveling on the determined route.

At step S408, the control system controls the vehicle to be driven autonomously using lateral and longitudinal driving controls based on the sequence of driving instructions. Wheel odometry and lateral position relative to road or lane boundaries are used to drive the vehicle to the next point on the vehicle route. For example, the control system can cause the vehicle to drive in a simple motion of following a curb or lane boundary given wheel odometry, observed two-dimensional road curvature, and distance to a next destination along the vehicle route. The control system may use longitudinal vehicle controls to drive the vehicle in order to reduce the along-the-road distance to subsequent locations along the vehicle route. Further, the control system may use lateral vehicle controls to keep the vehicle within road or lane boundaries over the vehicle route.

In the exemplary control system and method 400, a control system may execute an algorithm at 500 while the vehicle is being driven autonomously, to continuously identify objects using object reference data.

At step S410, a control system may estimate an expected vehicle position based on detected object information, including object position data, for objects that have been identified along the vehicle route. The vehicle will be autonomously driven to update (match) its position and orientation ("pose"), with the estimated position that is expected from a pattern of identified objects, so as to minimize a mismatch while avoiding collisions with other vehicles and pedestrians. The control system may continuously estimate and update the vehicle's position until the vehicle reaches the destination at the end of the route.

Figure 5:
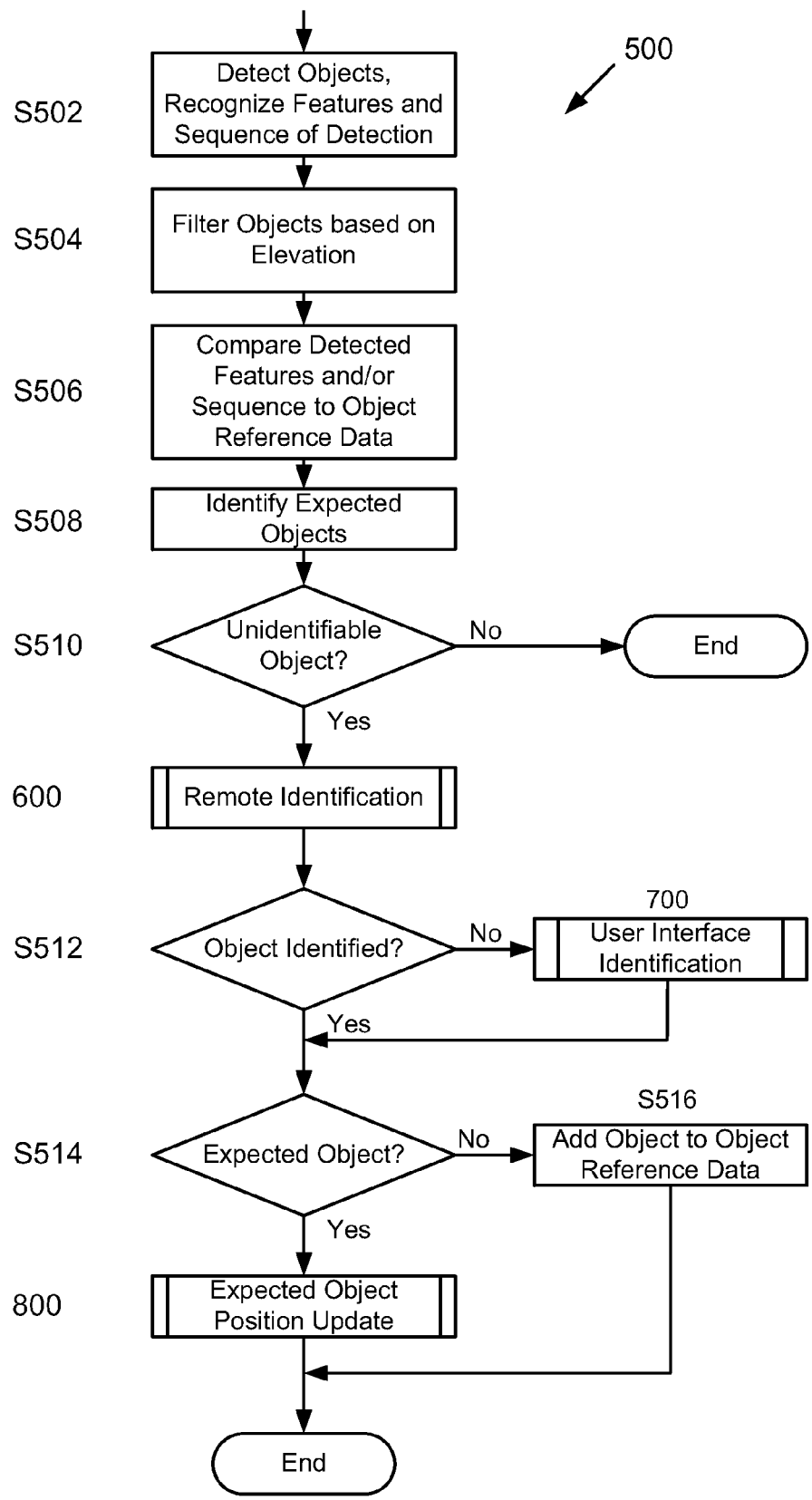
FIG. 5 is an algorithmic flow chart illustrating an exemplary method and process of identifying objects.

The exemplary algorithm for identifying objects is illustrated in FIG. 5.

At step S502 the control system detects objects along the vehicle route by utilizing the various sensors provided on the vehicle. The control system recognizes features of the detected objects (which may include position data), and may also recognize a sequence in which the objects are detected.

At step S504, the control system processes and filters the position and recognized feature data of detected objects into detected object information. The detected object information may also include recognized sequence data for each object, which can include a relative order in which a detected object was detected, with respect to other detected objects.

The control system may filter the feature and position data on the basis of object elevation, type (on-road or off-road), or both. For example, the control system may filter position and recognized feature data for detected elevated stationary objects (such as the objects OE1-OE4 of FIG. 2), into the detected object information. Instead, or in addition to, the control system may filter position and recognized feature data for detected off-road objects, as opposed to on-road objects (such as RE1 and RE2 of FIG. 2), into the detected object information.

At step S506, the control system will compare object reference data for expected objects, stored in the local database at step S406, to detected object information filtered from the position and recognized feature data at step S504. The process of comparison can either be continuous or episodic based on the density of expected and/or detected objects in areas along a vehicle route. For example, in areas where the density of objects is below a given level, the control system can compare object reference data and detected information on an as needed or episodic basis. The control system can perform comparisons "on-demand" (i.e., when the vehicle determines it is approaching an expected object, or an area in which an object is expected to be detected, a comparison between object information can be performed). Conversely, in situations where there is a greater density of expected objects, the control system can continuously compare object reference data and detected object information.

In other situations, the sequence in which objects are detected by the sensors can serve as another source of navigation information. For example, it may be the case that a road sign, traffic light, and utility pole are expected to be detected consecutively. If the utility pole is detected before the traffic light, which is detected before the road sign, it may be determined that the vehicle has moved in a direction that is opposite to an expected direction. The vehicle pose (i.e. the direction/alignment of the vehicle in, e.g., a navigation system or map) may be updated based on a comparison between sequence data in the detected object information and object reference data, and a determination the vehicle has moved in a direction that is opposite to the expected direction.

At step S508, the control system will identify the objects on the list of expected objects based on the comparison done at step S506. When the control system matches object reference data for an expected object to detected object information (which may include position data for a detected elevated stationary object), the control system will determine that the expected object has been identified as the detected object, and vice versa. The control system may continuously compare filtered position and recognized feature data (detected object information) to object reference data, to identify the expected objects.

At step S510, the control system will determine if either a detected object or an expected object cannot be, or has not been, identified. If all of the objects on the list of expected objects have been identified as detected objects, and all of the detected objects have been identified as expected objects, the exemplary algorithm for identifying objects 500 will end. If it is determined that an object, expected or detected, is not identified in step S508, the control system will perform the exemplary algorithm for remote identification 600, described in more detail below.

At step S512, the control system determines if the previously unidentified object has been identified with the algorithm for remote identification 600. If it has not been identified, the control system will perform the exemplary algorithm of user interface identification 700, described in more detail below. However, if the object is identified with the remote identification 600, the control system may determine if the object, previously unidentified, is an expected object at step S514.

At step S514, if the previously unidentified object is an expected object, the control system will execute the exemplary expected object position update algorithm 800, described in more detail below. This may occur as a result of a sensor malfunction, driving conditions causing a sensor error, a relocation of an expected object not accounted for by navigational data processed in step S404, or an imprecision of the navigational data regarding position data of an expected object.

At step S514, if the previously unidentified object was detected and not an expected object, the control system will add object information for the previously unidentified object to the vehicle local database at step S516. This may occur as a result of an addition, preceding a most recent update to the navigational data processed at step S404, of a tree, pole, building, etc. or other off-road elevated stationary objects.

Figure 6:
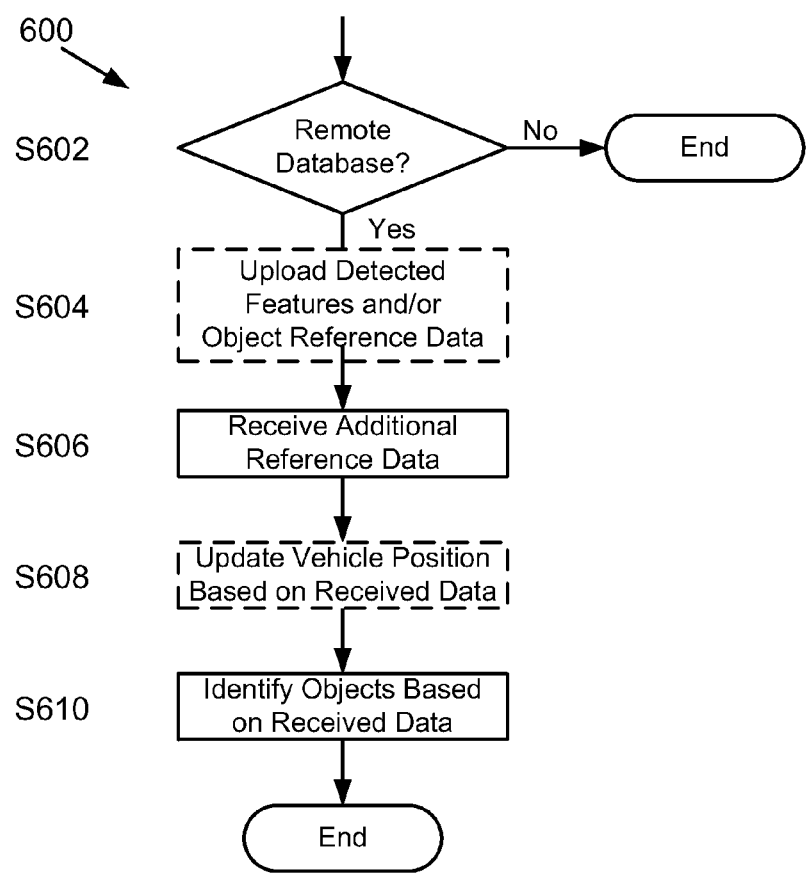
FIG. 6 is an algorithmic flow chart illustrating an exemplary method and process of acquiring additional object reference data from a remote data source.

FIG. 6 is an algorithmic flow chart illustrating remote identification algorithm 600.

At step S602, a control system may determine if a remote database is accessible, via a wireless network for example. When a control system determines a remote database is not available the remote identification algorithm 600 may end without identifying the unidentified object.

At step S604, when the control system determines the remote database is accessible, a control system may upload object data (object reference data or detected object information), or navigational data to the remote database. For example, a control system may upload object reference data of an expected object when an unidentified object is determined to be an unidentified expected object. The control system may also upload filtered detected features (detected object information) when an unidentified object is a detected object that has not been identified as an expected object. In another example, the control system may upload navigational data indicating the approximate location of the vehicle.

At step S606, a control unit may receive additional reference data from a remote database. The remote database may send additional reference data that may include a vehicle position based on the object reference data or detected object information uploaded to the remote database, an identification of an object, and/or additional object reference data.

At step S608, a control system may determine the additional reference data includes a vehicle position. In this situation the control system may update the vehicle's position similar to step S410.

At step S610, a control system may identify the unidentified object based on additional reference data. In a situation where a control system is provided at step S606, with additional reference data including additional object reference data, the control system may compare the object reference data and/or detected object information with additional object reference data to identify the unidentified object. If an identification occurs, the control system may determine if the previously unidentified object is an expected object, or a detected object in addition to the expected objects.

At step S610, a control system may also compare the object reference data to verify that each of the expected objects is still present, and remove object reference data from the local database for expected objects that have not been detected, and subsequently not verified. In addition, at step S610 a control system may modify object reference data corresponding to any of the expected objects, even if previously detected and identified, where corresponding additional object reference data indicates a feature, which may include type, size, position, etc., has changed for any of the expected objects.

At step S610, if an identification does not occur, the control system may populate a supplemental list of objects based on the additional reference data.

Figure 7:
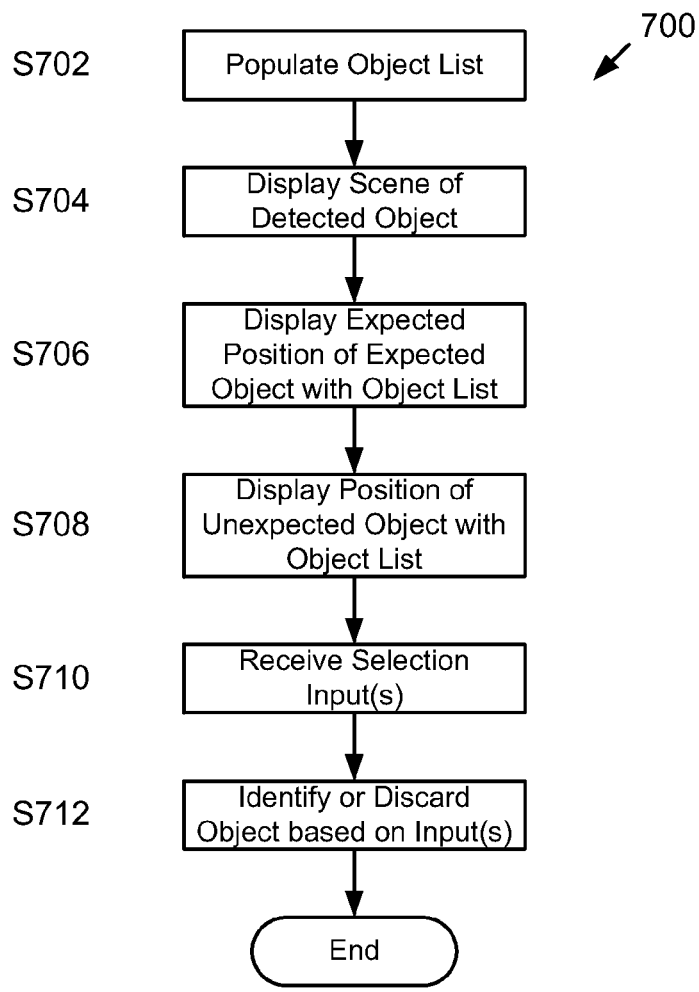
FIG. 7 is an algorithmic flow chart illustrating an exemplary method and process of acquiring user input data to identify a previously unidentified object.

FIG. 7 is an algorithmic flow chart illustrating remote identification algorithm 700.

At step S702, a control system may populate an object list that may be used by a driver to identify, correct, or add objects and corresponding object information, which may include position, to a local database of a vehicle. A control system may populate an object list with expected objects (identified and unidentified), common objects which may include objects such as trees, signs, poles, etc., and objects from the supplemental list of objects if previously populated at step S610.

Figure 9:
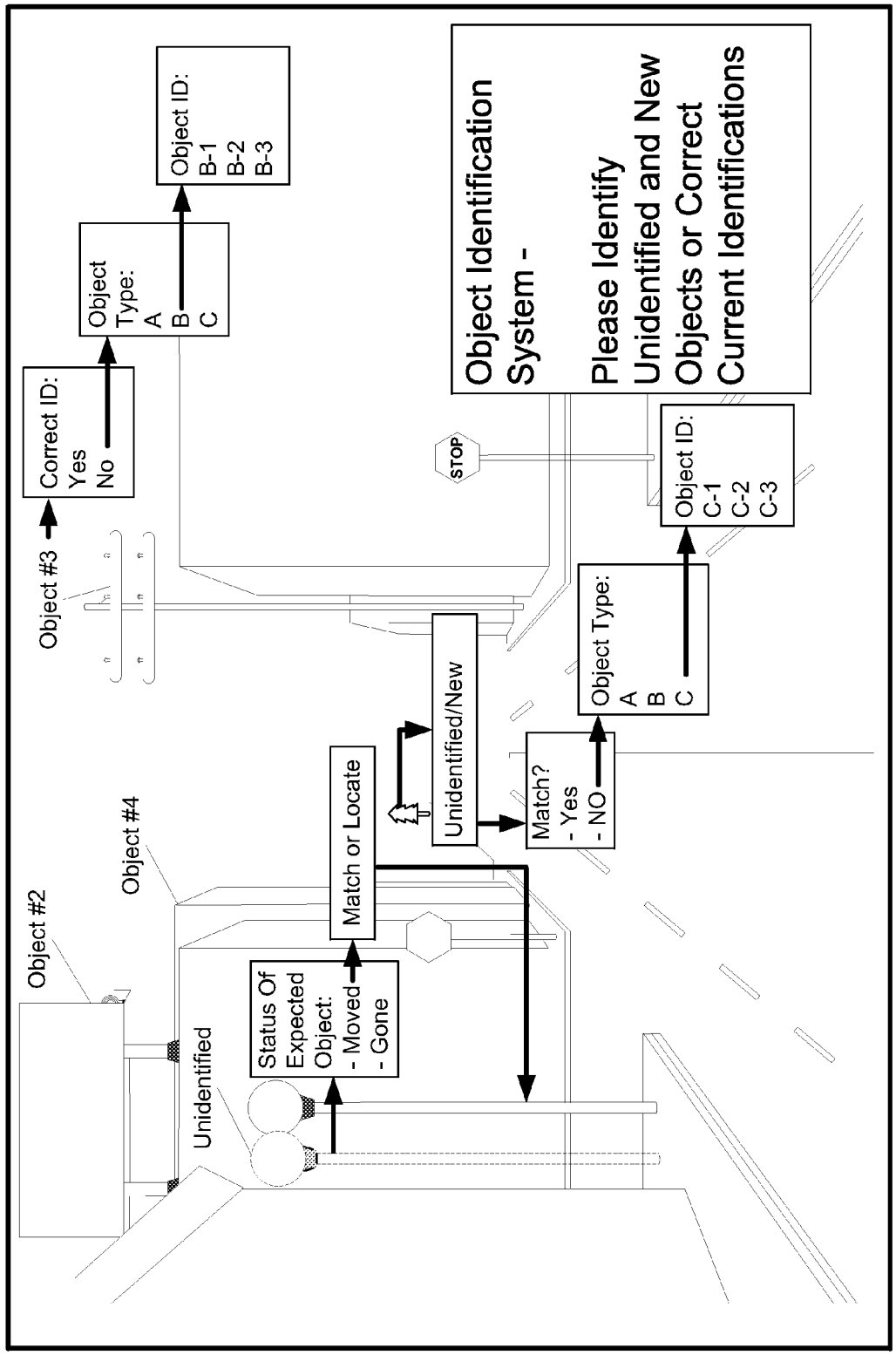
FIG. 9 illustrates a human machine interface used to identify an unidentified object by a user.

At step S704, a control system may display a scene of detected objects to a user interface, such as in FIG. 9. A control system may display all the objects detected in step S502, or only the objects corresponding to the filtered detected object information of step S504. The display of the user interface can be a separate screen placed in a location convenient for the driver to perform appropriate actions without jeopardizing the safety of human assisted autonomous driving. A transparent display, for example, a display projected on the windshield with a voice interface (hybrid voice-visual HMI), can be utilized. The display can also be embedded into at least a part of the windshield.

At step S706, a control system may display expected positions of an expected objects that have not been identified, and an object list as populated in step S702 next to the expected position of the expected object.

At step S708, a control system may display an object list next to unidentified objects that have been detected by the various sensors of the vehicle at step S502.

At step S710, a control system may receive a selection input from at least one object list that pertains to an unidentified expected object or detected object displayed on the user interface. At step S710, a control system may receive a list selection input or a user definition input. In the former case, a selection input is provided through the selection of one of the objects of an object list displayed with an unidentified object on the user interface. In the latter case, a selection input is provided through the selection of a secondary selection option that enables a driver to input a definition for an unidentified object or indicate an expected object is not present. A control system may also receive a selection input indicating an undesignated object in a display should be identified. In this situation a control system may provide an object list next to the undesignated object when a driver selects the undesignated object on a touch screen of a user interface.

At step S712, a control system may identify previously unidentified objects based on a selection input. In addition a control system may verify whether an expected object that has not been identified is still present, by requesting a status of an expected object with a secondary selection input.

At step S712, where a driver indicates the expected object is not present, a control system can remove corresponding object reference data from a vehicle's local database. At step S712, in a situation where the previously unidentified object is an expected object and a driver indicates the expected object is present but not located in an expected position, a control system can request a driver to match an expected object to a detected object displayed on the user interface. In addition, where a driver indicates the expected object is present but not detected, a control system can request the driver to locate the expected object on a touch screen of a user interface. The control system can store the position data for the expected object for use with the algorithm for expected object position update 800.

The driver input can be provided by issuing appropriate voice commands, as an alternative to typing/touch screen commands. For example, if an object is to be identified by a driver, then this object can be highlighted on a display of a user interface first and a voice instruction can be requested from the driver. The content of the voice instruction requested may include an element class or other type of identification instruction. In another example, the driver can correct an expected location to a location where an object in question is actually located, by issuing a verbal instruction such as "move left," "move right," and "locate."

Figure 8:
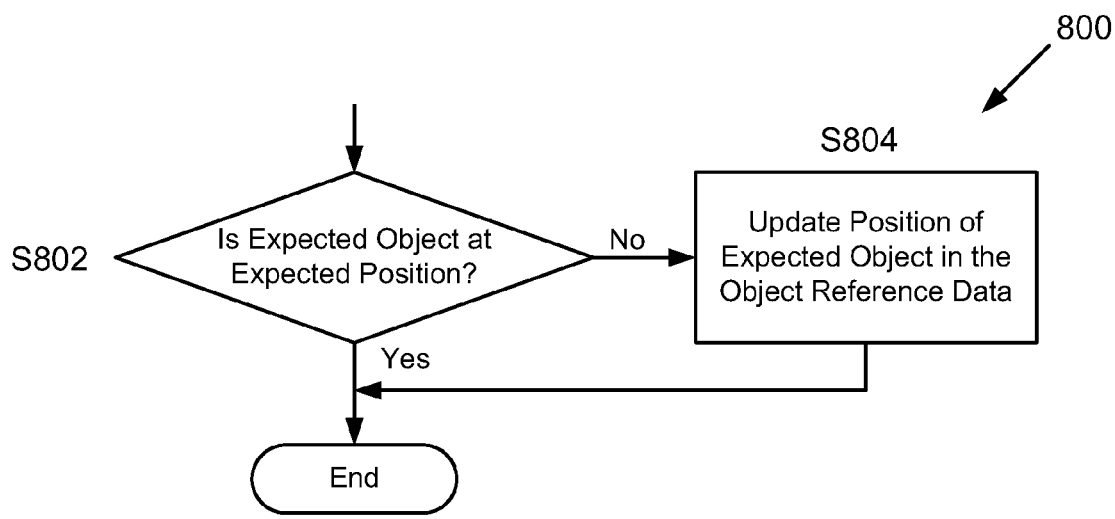
FIG. 8 is an algorithmic flow chart illustrating an exemplary method and process of updating an object's position in a local database.

FIG. 8 is an algorithmic flow chart illustrating an expected object position update algorithm 800.

At step S802, a control system may determine position data associated with an expected object, identified with the remote identification algorithm 600 or the user interface identification algorithm 700, does not match position data of corresponding object reference data stored in the vehicle database for the expected object.

At step S804, a control system may update position data in the object reference data corresponding to the expected object, with the position data associated with the expected object when it was identified with the remote identification algorithm 600 or the user interface identification algorithm 700.

Figure 10:
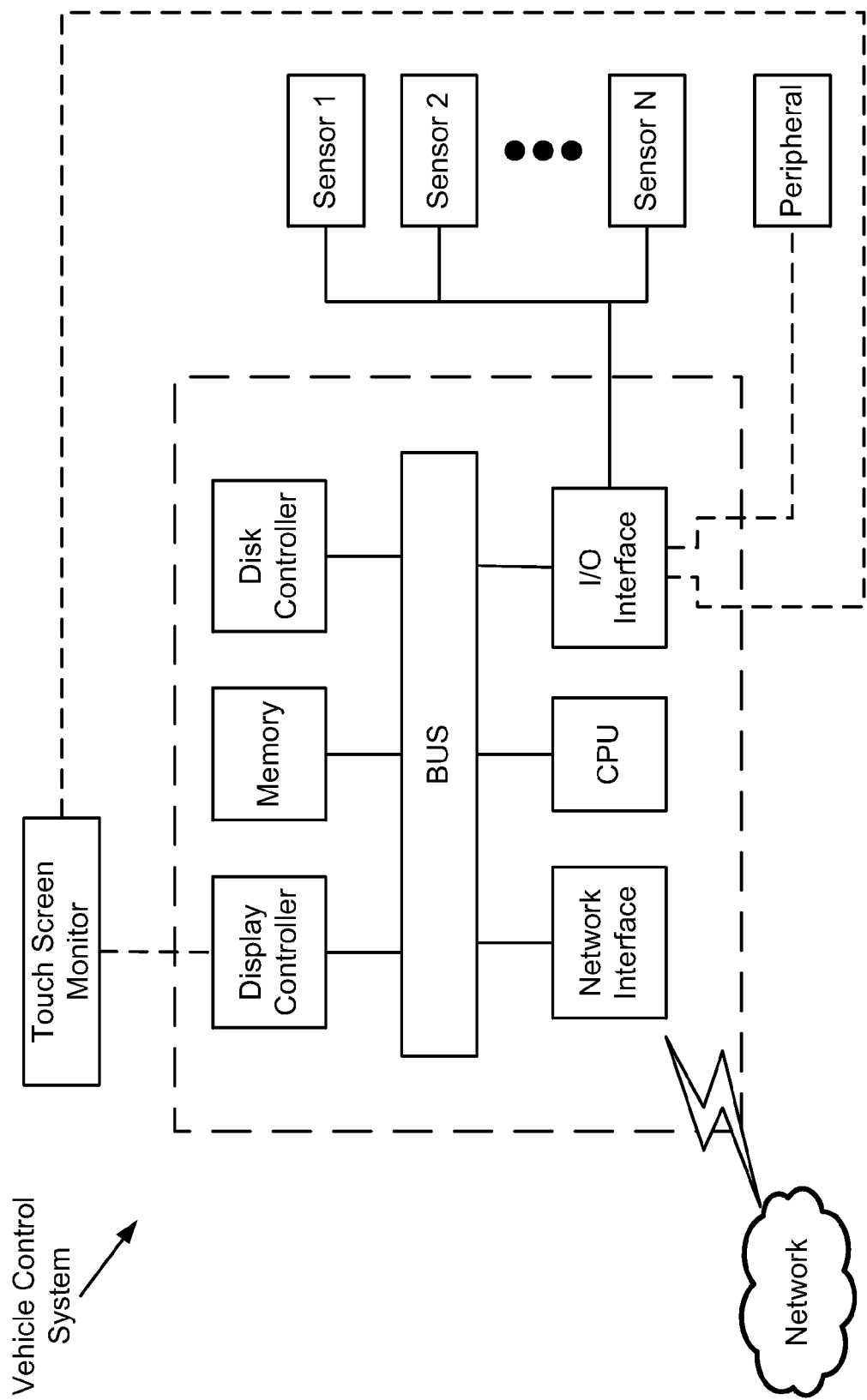
FIG. 10 schematically illustrates exemplary processing hardware of a navigation system.

FIG. 10 illustrates an exemplary processing system, and illustrates exemplary hardware found in a controller or computing system (such as a vehicle control computing unit) for implementing and/or executing the processes, algorithms and/or methods described in this disclosure.

As illustrated in FIG. 10, a processing system in accordance with this disclosure can be implemented using a microprocessor or its equivalent, such as a central processing unit (CPU) and/or at least one application specific processor (ASP) (not shown). The microprocessor is a circuit that utilizes a computer readable medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can control a hard disk or optical disk drive.

The microprocessor as aspects thereof, in an alternate embodiment, can include or exclusively include a logic device for augmenting or fully implementing this disclosure. Such a logic device includes, but is not limited to, an application-specific integrated circuit (ASIC), a field programmable array (FPGA), a generic-array of logic (GAL), and their equivalents. The microprocessor can be a separate device or a single processing mechanism. Further, this disclosure can benefit from parallel processing capabilities of a multi-cored CPU.

In another aspect, results of processing in accordance with this disclosure can be displayed via a display controller to a touch screen monitor which provides a use interface. The display controller would then preferably include at least one graphic processing unit, which can be provided by a plurality of graphics processing cores, for improved computational efficiency. Additionally, an I/O (input/output) interface is provided for inputting signals and/or data from sensors 1, 2, ... N, which may include cameras, lidar, sonar, radar, etc., and for outputting control signals to a touch screen monitor. The touch-screen monitor has a touch sensitive interface for providing a command/instruction interface.

Further, other input devices, can be connected to the I/O interface as a peripheral. For example, a GPS updating unit (which may take the form of a flash drive) can be connected to the I/O interface to provide for downloading updated navigational data to the vehicle control system.

The above-noted components can be coupled to a network, such as the internet or local intranet, via a network interface for the transmission or reception of data, including controllable parameters. A central BUS is provided to connect the above hardware components together and provides at least one path for digital communication there between.

A number of implementations have been described. Nevertheless, it will be understood that various modifications may be made without departing from the spirit and scope of this disclosure. For example, advantageous results may be achieved if the steps of the disclosed techniques were performed in a different sequence, if components in the disclosed systems were combined in a different manner, or if the components were replaced or supplemented by other components.

The invention claimed is:

1. An apparatus for a vehicle comprising:
a navigation unit configured to determine a position of the vehicle;
a detection unit configured to detect first objects that are external to the vehicle, and to recognize features of the first objects;
a filter unit configured to filter a portion of the first objects which include features elevated above a road by a minimum elevation as second objects that are to be identified;
a local database configured to store object reference data, the object reference data including feature data and position data identifying positions of expected objects that are expected to be detected;
an identification unit configured to identify the expected objects from the second objects based on a determined position of the vehicle by comparing features of the second objects that are recognized by the detection unit to the feature data of the expected objects stored in the local database; and
a transceiver configured to communicate with a remote database and access additional object reference data stored by the remote database, the additional object reference data including additional feature data and corresponding position data identifying positions of respective objects, wherein
the identification unit determines a third object cannot be identified and the transceiver is configured to communicate with the remote database to access the additional object reference data, and the identification unit is configured to compare features of the third object to the additional feature data to identify the third object,
the identification unit is configured to update the object reference data with updated position data in response to the identification unit determining:
the third object is one of the expected objects, and
the one of the expected objects has moved from a position previously identified by position data included in the object reference data, and
the navigation unit is further configured to update the position of the vehicle based on position data of identified objects.

2. The apparatus according to claim 1, wherein:
in response to the identification unit determining the third object cannot be identified, the identification unit is further configured to compare respective feature data between the local database and the remote database, for each of the expected objects based on the determined position of the vehicle, and update the local database to reflect additional information included in the remote database.

3. The apparatus according to claim 2, wherein the additional information includes updated position or feature data.

4. The apparatus according to claim 2, wherein:
the identification unit is configured to compare the recognized features of the first objects to feature data of the one of the expected objects to identify the one of the expected objects.

5. The apparatus according to claim 2, wherein:
one of the second objects that is detected by the detection unit is the third object that cannot be identified,
in response to the identification unit determining that the third object is not one of the expected objects the transceiver is configured to transmit recognized features of the one of the second objects to the remote database, and
the transceiver is configured to receive an identification response from the remote database.

6. The apparatus according to claim 5, wherein, in response to the identification response including an identification of the third object and a corresponding position, the local database is configured to store corresponding object reference data for the third object.

7. The apparatus according to claim 5, wherein, in response to the identification response including position data of the vehicle, which the remote database determined based on the recognized features transmitted to the remote database, the navigation unit is configured to update the position of the vehicle based on the position data included in the identification response.

8. The apparatus according to claim 1, further comprising:
a display; and
a user interface unit,
wherein the display is configured to:
display an image of an area in which the third object is located or expected to be located in response to the identification unit determining the third object cannot be identified after the identification unit compares features of the third object to the additional feature data of the additional object reference data or is unable to access the additional object reference data to identify the third object,
receive at least one of an object selection input and an object definition input from the user interface unit, and
identify the third object based on the one of the object selection input and the object definition input.

9. The apparatus according to claim 8, wherein
the identification unit is configured to determine feature data of the third object and position data identifying a position of the third object based on the one of the object selection input and the object definition input, and
the identification unit is configured to update the object reference data with the determined feature data and the determined position data.

10. The apparatus according to claim 8, wherein the identification unit is configured to remove feature data and position data included in the object reference data in response to:
the identification unit determining the third object is the one of the expected objects, and
one of the identification unit comparing the features of the one of the expected objects to the additional feature reference data and the display receiving the at least one of the object selection input and the object definition input from the interface unit indicates the one of the expected objects is no longer present.

11. The apparatus according to claim 8, wherein:
the local database is configured to store common object reference data including feature data of common objects that are independent of the determined position of the vehicle,
the identification unit is configured to generate an object list based on the object reference data and the common object reference data, when the identification unit is unable to access the additional object reference data, and
the identification unit is configured to generate the object list based on the object reference data, the common object reference data, and the additional object reference data, when the identification unit is unable to identify the third object by comparing the features of the third object to the additional feature data of the additional object reference data.

12. The apparatus according to claim 11, wherein the display is configured to display a selection menu including the object list to provide the user interface unit on a screen of the display when displaying the image.

13. The apparatus according to claim 12, wherein:
the object selection input is provided through the selection menu and is a selection of an item in the object list, and
the object definition input is provided through the selection menu and is a selection of an independent object identification, wherein the independent object identification is a user definable input independent of the object list.

14. The apparatus according to claim 1, wherein the minimum elevation is 10 ft.

15. The apparatus according to claim 1, wherein:
the detection unit is configured to recognize features of the first objects based on an output image of an imaging device, the imaging device including at least one of one or more cameras and one or more lidars, and
the identification unit is configured to perform feature comparison with the output image to compare the features of the first objects recognized by the detection unit to feature data.

16. An apparatus for a vehicle comprising:
navigation means for determining a position of the vehicle;
detection means for detecting first objects that are external to the vehicle, and for recognizing features of the first objects;
a filter means for filtering a portion of the first objects which include features elevated above a road by a minimum elevation as second objects to be identified;
storage means for locally storing object reference data, the object reference data including feature data and position data identifying positions of expected objects that are expected to be detected;
identification means for identifying the expected objects from the second objects based on a determined position of the vehicle by comparing features of the second objects that are recognized by the detection means to the feature data of the expected objects stored in the storage means; and a transceiver for communicating with a remote database and accessing additional object reference data stored by the remote database, the additional object reference data including additional feature data and corresponding position data identifying positions of respective objects, wherein
the identification means determines a third object cannot be identified and the transceiver communicates with the remote database to access the additional object reference data, and the identification means compares features of the third object to the additional feature data to identify the third object,
the identification means updates the object reference data with updated position data in response to the identification means determining:
the third object is one of the expected objects, and
the one of the expected objects has moved from a position previously identified by position data included in the object reference data, and
the navigation means updates the position of the vehicle based on position data of identified objects.

17. A non-transitory computer-readable storage medium including executable instructions, which when executed by one or more processors, causes the one or more processors to perform a method for a vehicle, comprising:
determining a position of the vehicle;
detecting first objects that are external to the vehicle, and recognizing features of the first objects;
filtering a portion of the first objects which include features elevated above a road by a minimum elevation as second objects to be identified;
accessing, from a local database, object reference data that is stored in the local database, the object reference data including feature data and position data identifying positions of expected objects that are expected to be detected;
identifying the expected objects from the second objects based on a determined position of the vehicle by comparing features of the second objects that are recognized in the recognizing to the feature data of the expected objects stored in the local database;
communicating with a remote database in response to determining that a third object cannot be identified, and accessing additional object reference data of the remote database, the additional object reference data including additional feature data and corresponding position data identifying positions of respective objects;
comparing features of the third object to the additional feature data to identify the third object;
updating the object reference data in the local database with updated position data in response to determining:
the third object is one of the expected objects, and
the one of the expected objects has moved from a position previously identified by position data included in the object reference data; and
updating the position of the vehicle based on position data of identified objects.

* * * * *